United States Patent [19]

Stephen et al.

[11] 4,302,846

[45] Nov. 24, 1981

[54] MARKER TAG FOR A DETECTION SYSTEM

[76] Inventors: James H. Stephen, 35 Appleford Dr., Abingdon, Oxfordshire; John D. McCann, 6 Stonebridge Rd., Steventon, Abingdon, Oxfordshire, both of England

[21] Appl. No.: 899,422

[22] Filed: Apr. 24, 1978

[30] Foreign Application Priority Data

Aug. 19, 1977 [GB] United Kingdom ............... 34861/77

[51] Int. Cl.$^3$ ............................................ G01S 2/18

[52] U.S. Cl. ...................................... 455/19; 340/572; 343/6.8 R

[58] Field of Search ........................ 325/8, 9, 113, 117, 325/140, 185; 340/539, 568, 571, 572; 331/76; 343/18 D, 6.5 R, 6.5 SS, 6.8 R; 455/19, 41

[56] References Cited

U.S. PATENT DOCUMENTS

| | | | |
|---|---|---|---|
| 3,182,315 | 5/1965 | Sweeney | 343/6.5 |
| 3,518,546 | 6/1970 | Augenblick et al. | 325/8 |
| 3,609,741 | 3/1971 | Miller | 340/280 |
| 4,139,844 | 2/1979 | Reeder | 340/572 |

*Primary Examiner*—Benedict V. Safourek

[57] ABSTRACT

This invention is directed to a receptor reradiator for use in a system for detecting the position of the receptor reradiator in a surveillance zone. It comprises a first aerial means for receiving the first signal, second aerial means for radiating said reply signal and a non-linear element coupling the first and second aerial means.

10 Claims, 6 Drawing Figures

MARKER TAG FOR A DETECTION SYSTEM

The invention relates to detection systems for monitoring the position in a checking zone of an article, and to passive marker tags for such systems.

Detection systems for detecting the presence in a checking zone of an article are primarily used in stores and warehouses for detecting so far as is possible, the unauthorised removal of articles. For this purpose a checking zone is established for example in a store which can be said to be downstream of cash paying points. Each article on sale in the store is provided with a tag which in the normal course of events, is removed at the paying point but if not so removed, its presence in the detection zone operates an alarm.

Various systems are in use and these broadly fall into two main categories namely magnetic and radio frequency systems. With magnetic systems the tag incorporates magnetised material the presence of which in the detection zone is detected by magnetic monitoring equipment. This type of system has the disadvantage that the monitoring equipment must be very carefully adjusted otherwise it will either not provide an alarm when required to do so or it may provide a false alarm due to metallic objects normally carried by a person, disturning the magnetic field.

Radio frequency systems can be made more sensitive and also reliable and one such system employs a tag having electrical components thereon which pick up energy radiated from a transmitter and by means of a non-linear element, re-radiates the energy at twice the frequency of the received radiation. A receiver is provided which is tuned to the frequency of the reradiated signal and when such a signal is detected, an alarm is given. One problem with such a system if the fact that the transmitter may go out of adjustment and radiate a second harmonic signal which will be detected by the receiver and thereby will provide a false alarm. Other faults with such a system can occur.

The present invention seeks to provide a detection system which is relatively simple and convenient to use and is less susceptible to triggering by extraneous signals.

The present invention also seeks to provide a passive marker tag for such a system, and also a method of monitoring the position of such a tag in a surveillance zone.

The invention provides in its broadest aspect a system for monitoring the position of a receptor re-radiator in a surveillance zone, characterised by first means for transmitting a first signal through said zone, a receptor reradiator operable in response to reception of said signal to radiate at least one reply signal which is a function of said first signal and of the position of said receptor reradiator in the zone, a receiver for receiving said reply signal, means controlled by the receiver in dependence upon said reply signal to indicate the position of the receptor reradiator in the zone, and an alarm triggerable by the receiver responsively to the latter receiving the reply signals.

The invention provides in another of its aspects a receptor reradiator for a system characterised by a first aerial means for receiving said first signal, second aerial means for radiating said reply signal, and a non-linear element coupling said first and second aerial means.

The invention provides in yet another of its aspects a method of monitoring the position of a receptor reradiator in a surveillance zone, characterised by radiating a first signal through said zone; detecting in said zone the presence of at least one reply signal which is a function of said first signal and of the position of the receptor reradiator in the zone in dependence upon said reply signal indicating the position of the receptor reradiator in the zone, and triggering an alarm responsively to the detection of the reply signals.

The present invention is further described hereinafter, by way of example, with reference to the accompanying drawings, in which.

Figure 1:
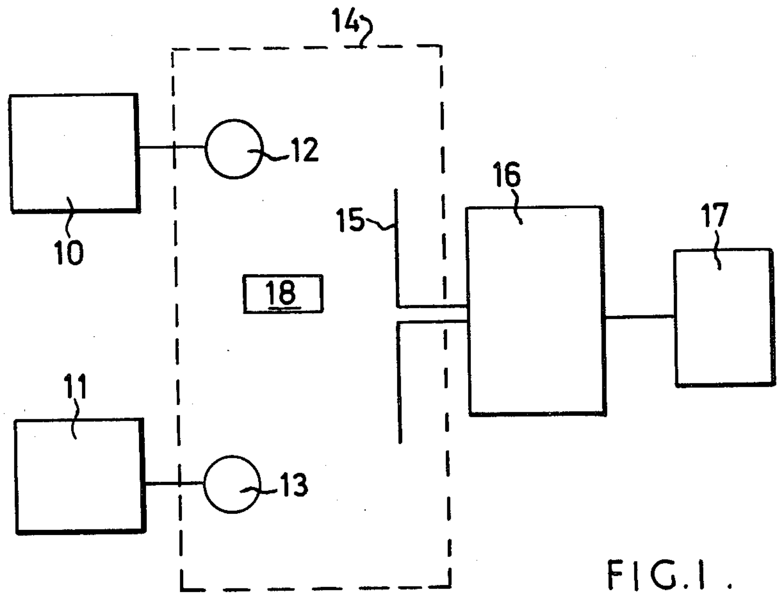
FIG. 1 is a schematic diagram of one embodiment of a system according to the present invention.

The system illustrated in FIG. 1 utilises two transmitters 10, 11 which operate in the S.W. or V.H.F. part of the radio frequency bands. The transmitters are connected to feed respective aerials 12, 13 which are disposed in or adjacent a detection zone which is indicated at 14 and are arranged to transmit their respective signals through the zone 14.

The zone 14 may include a conveyor on which merchandise travels or may define an aisle or doorway in a department store or the like through which customers must pass. The zone 14 may even be a room, the system being set to activate any receptor reradiator carried by articles of merchandise in the room.

Figure 2:
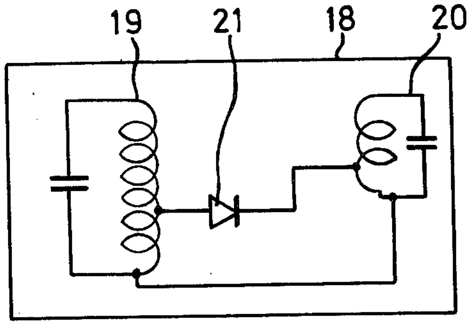
FIG. 2 is a circuit diagram of a typical tuned diode receptor reradiator for the system of FIG. 1.

A marker tag 18 which is normally attached to an article of merchandise carries a receptor reradiator, such as is shown in FIG. 2, which includes a tuned resonant circuit 19 tuned to receive the two signals from the transmitters 10, 11, a non-linear device in the form of a diode 21 and a tuned reradiator circuit 20. An aerial 15 of a receiver 16 is also located in or adjacent the zone 14 and is tuned to receive signals radiated by the tuned circuit 20. On reception of such signals the receiver 16 triggers a warning device 17 which may be audible, visual or both audible and visual.

The fundamental frequencies $f_1$ and $f_2$ to which the two transmitters 10, 11 are respectively tuned, differ by a relatively small amount as compared with the magnitude of the frequencies. In a particular example the frequency $f_1$ of transmitter 10 is 27.0 $MH_Z$ whilst the frequency $f_2$ of the transmitter 11 is 27.2 $MH_Z$. An alternative choice for the fundamental frequencies is approximately 450 $MH_Z$.

The tuned circuit 19 of the tag 18 is tuned to a centre frequency $f_c$ which is substantially midway between the two transmitter fundamental frequencies, i.e. the sum of the transmitter frequencies divided by two $f_c=(f_1+f_2)/2$. The bandwidth of the tuned circuit 19 is also designed sufficiently wide to include the two transmitter frequencies without introducing any serious reduction in received signal strength. The tuned circuit 19 is coupled to the tuned circuit 20 by the diode 21. The latter is merely one example of a non-linear device which may be used and which utilises the well known fact that the non-linear response of such a device to received signals of different frequencies gives rise to sum and difference frequencies, known as inter modulation products, as well as harmonics. With received frequencies of $f_1$ and $f_2$ (in the particular example 27.0 $MH_Z$ and 27.2 $MH_Z$) the diode 21 generates the following major inter modulation and harmonic frequencies $=2f_1$ (54 $MH_Z$), $2f_2$ (54.4 $MH_Z$), $f_1+f_2$ (54.2 $MH_Z$) and $f_2-f_1$ (0.2 $MH_Z$).

The tuned circuit 20 is tuned to a selected inter modulation product, in the particular example 54.2 $MH_Z$, and radiates this signal to the receiver aerial 15. Thus, if a tag 18 is brought into the detection zone the radiated signal from the tag is detected by the receiver 16 which then triggers the warning device 17, the receiver 16 being tuned to the radiated signal frequency (54.2 $MH_Z$) with sufficient selectivity to preclude triggering of the warning device 17 by adjacent signals.

The tag 18, however, is also designed to radiate one or both of the second harmonics $2f_1$ and $2f_2$ of the transmitter fundamental frequencies to enable the position of the tag 18 in the detection zone to be ascertained. Radiation is effected by the tuned circuit 20 where the latter is tuned to 54.2 $MH_Z$, or by a further tuned circuit, now shown, where the difference between selected inter modulation project and the second harmonic is sufficiently great to warrant it. (The or both second harmonics may alternatively be used to activate the warning device, if desired, although this does increase the risk of false alarms).

As shown in FIG. 1 the aerials 12 and 13 are loop aerials (equally dipole aerials can be utilised although these lack the directional characteristics of loop aerials. In the case of the loop aerial the diameter of the loop would be in the order of one meter) which are separated from each other, as shown, so as to produce in the detection zone a variation in the field strength of the signal radiated from each transmitter. Clearly in the centre of the detection zone the field of the signals $f_1$ and $f_2$ preferably should be the same but towards the fringes of the zone moving in the direction of the aerials, the field strength of the signal radiated from one transmitter will increase, whilst at the same time the field strength of the signal radiated from the other transmitter will decrease. Therefore, the amplitudes of the second harmonic signals radiated by the tag 18 will vary as the signal strength of the signals received by the tuned circuit 19 from the transmitter varies. This fact is utilised by the receiver so that whilst it causes the warning device 17 to operate when a signal corresponding to the sum of the transmitter frequencies is obtained, it also provides an output responsive to the harmonics of the transmitter frequencies. Comparison of the relative strengths of these further signals provides an indication of the position of the tag 18 in the detection zone. Where the zone 14 is a doorway, for example, the transmitters may be placed on respective sides thereof. Where the zone is an aisle the transmitters may be placed at respective ends thereof.

In order to provide further safeguards against false alarms, one or both of the transmitters' 10, 11 radiated fundamental frequencies may be modulated and this modulation will appear in the signals received at the receiver. The signals can be demodulated in the receiver and compared with the original modulating signal or signals to determine whether the signal arriving at the aerial 15 has indeed originated from a tag which is in the detection zone. Alternatively triggering of the warning device 17 may be effected only when the receiver receives two or more of the inter modulation products simultaneously.

Where one of the fundamental frequencies is modulated, what is known as the cross modulation effect will also give rise to radiation by the tag 18 of the second harmonic of the other fundamental frequency but with the modulation imposed thereon. The depth of modulation will vary with the distance of the tag 18 from the modulated and unmodulated transmitters and the depth of modulation therefore provides an additional indication of the tag position.

Although the receiver and the circuit 20 are tuned to the sum of the fundamental frequencies of the transmitters for the purpose of triggering the warning device 17, this purpose may be served by any one of the inter modulation products. For example, it is possible for the receiver and circuit 20 to be tuned to the difference frequency i.e. 0.2 $MH_Z$.

By using the radio frequency bands the system hereinbefore described has the advantage over a system which uses a single microwave frequency that the electronic circuitry of the receiving and transmitting sections is simpler, and there is less shielding of the marker tags by persons carrying articles being protected. Whilst in the particular example hereinbefore described the fundamental frequencies are 27.0 and 27.2 $MH_Z$, this advantage may be obtained with fundamental frequencies up to about 1000 $MH_Z$.

The resonant circuits on the tag may be in the form of tuned loops, or if space permits, similar to a folded dipole. It should be remembered that it is necessary for the tag to be affixed to a sales article and therefore it needs to be comparatively small, for example, about 100 mm$\times$25 mm$\times$3 mm thick. At the same time however it should be resistance to bending and also abrasion. A convenient material is a copper clad glass fibre laminate of the type used in the manufacture of printed circuit boards providing some form of coating is applied, for example a plastics material, or providing the material forming the track is suitably resistant to abrasion. Other forms of laminate can be used providing suitable protection is provided and the non-linear device may be a junction of materials which exhibits a non-linear current/voltage relationship at the operating frequency.

A number of different examples for the constructional details of the marker tag 18 are described below.

The resonant circuits are formed by printing thin aluminium or copper conductors onto a substrate, specific examples being stiff cardboard or plastics sheet to form inductance coils. Each coil is tuned to the appropriate appropriate frequency by placing a pair of thin metal film conductors on opposite sides of the substrate to form a capacitor, the substrate forming the dielectric.

The non-linear element comprises a metal to semiconductor combination and specific examples are:

(a) cuprous oxide semi-conductor connected between a pair of copper electrodes, (b) cuprous sulphide on cadmium sulphide semi-conductor connected between a pair of copper electrodes, (c) selenium semi-conductor connected between a pair of copper electrodes, (d) titanium dioxide semi-conductor connected between a titanium electrode and a silver electrode, (e) lead sulphide semi-conductor connected between a pair of copper or aluminium electrodes, (f) magnesium oxide semi-conductor connected between a magnesium electrode and an aluminium electrode, (g) aluminium ($Al_2O_3$) semi-conductor connected between a pair of aluminium electrodes,
(h) zirconia ($ZrO_2$) on zirconium connected between aluminium electrodes,
(i) gallium arsenide semi-conductor connected between a pair of gold or aluminium electrodes.

The non-linear element is formed onto the substrate and specific examples of the process for achieving this are as follows:
(i) screen printing the layers,
(ii) chemical formation of oxide and sulphide at elevated temperatures,
(iii) formation of oxide layers by electrolysis (for example, formation of alumina layers),
(iv) sputtering,
(v) evaporation.

In order to control the capacitance of the junction of the non-linear element, the area of the junction is controlled by a photo-lithographic process, by using a small mechanical press tool, or by using a pulse from a laser to form a contact over a small area.

An improvement in the positional definition of the above described system can be obtained if more than two transmitters are employed. For example if three transmitters are employed then whilst there are three sums of the three fundamental transmitter frequencies, it is likely that only two of these would be employed to give an indication of the approximate location of the tag within the detection zone.

Figure 3:
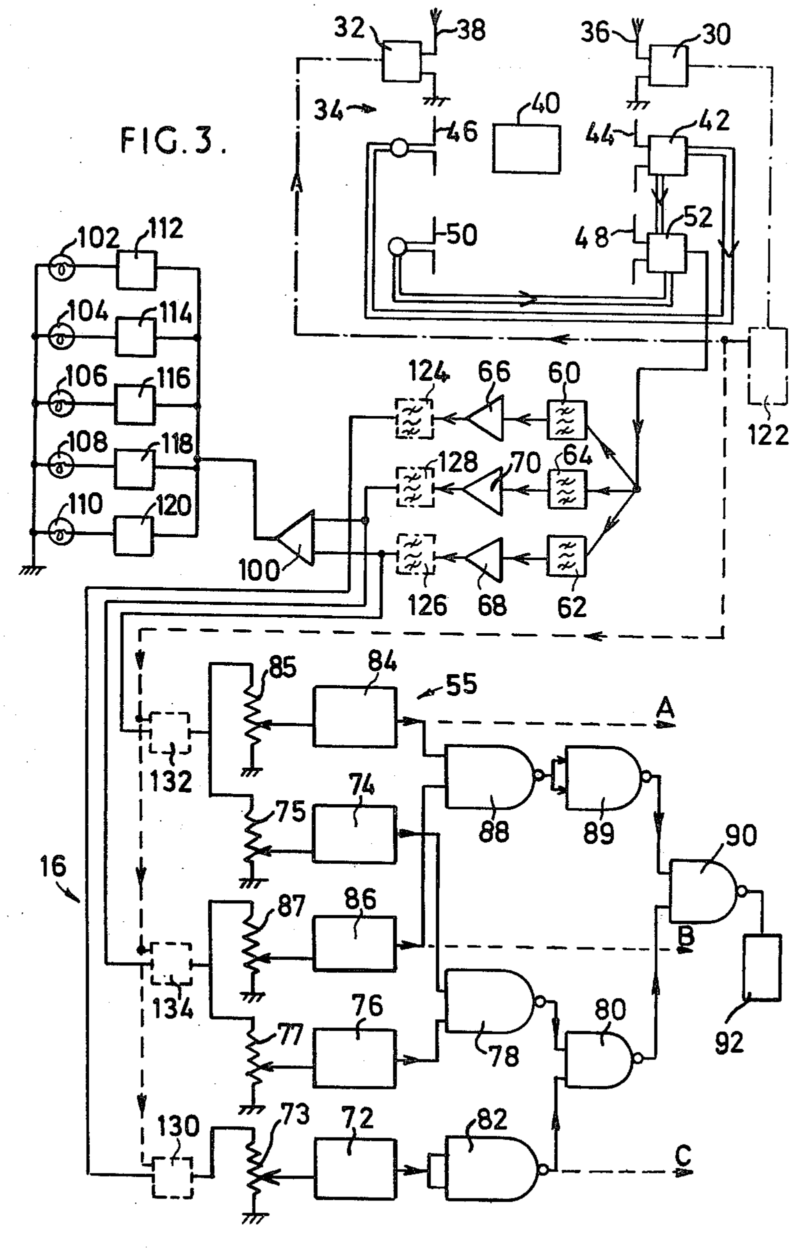
FIG. 3 is a schematic diagram of a second embodiment of a system according to the present invention.

A system using three transmitters is illustrated in FIG. 3 where the illustrated system uses two separate transmitters 30, 32 in the so-called induction band (16 to 150 KHz) together with a third transmitter 42 operating in or near the microwave band. The transmitters 30, 32 are placed at spaced apart locations in the zone 34 to be surveyed and are preferably at extreme locations in the zone, for example on respective sides thereof where the zone is a doorway and respectively adjacent the entrance to and exit from the zone where the latter is an aisle. Suitable frequencies for the transmitters are, for example, fa=130 KHz for transmitter 30 and fb=80 KHz for transmitter 32. Signals at these frequencies are radiated through the zone 34 by, for example, inductively loaded rod-like aerials 36, 38, or loop (i.e. continuous) aerials, excited by the transmitters to produce high strength electric and magnetic fields in the zone 34. The aerials may of course be located at the extremities of the zone 34 while the transmitters are remote therefrom and coupled to the aerials by suitable means.

The system of transmitters and associated aerial may be arranged either side of a doorway so to survey horizontally across the protected zone, or the items of system hardware may be arranged to survey vertically, preferably downwards over the zone to be protected, thus leaving the floor area unobstructed.

Figure 4:
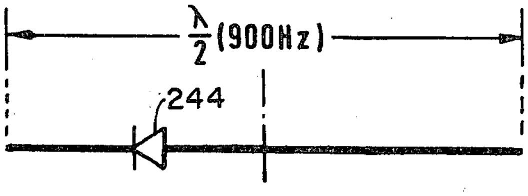
FIGS. 4 and 4A are circuit diagrams of receptor reradiators for the system of FIG. 3.

Since the cost and size of a passive receptor reradiator tag, such as tag 40, must be as small as practicable, such considerations ruling out the tag being capable of operating directly at the induction band frequencies, a third higher frequency $f_c$ is provided as a carrier for frequencies $f_a$ and $f_b$. The frequency $f_c$ is transmitted through the zone 34 as electromagnetic radiation from the third transmitter 42, the frequency being chosen for example at 900 MHz. The tag 40 again includes a non-linear device, preferably a diode 44, but the tuned circuits 19, 20 of the tag are replaced by a half wave dipole aerial resonant at frequency $f_c$ (900 MHz). The diode 244 is preferably offset from the electrial centre of the aerial to increase the effectiveness of the field picked up from the induction band transmitters 30, 32 as shown in FIG. 4.

The transmitter 42 preferably has two aerials 44, 46 located at opposite ends of the zone 34 to provide a more uniform distribution of electromagnetic radiation at 900 MHz throughout the zone.

Two receiver aerials 48, 50 tuned to 900 MHz are also located at opposite ends of the zone 34 to receive signals reradiated from the tag 40. The receiver aerials are coupled to a mixer 52 to which the transmitter 42 also feeds a greatly attenuated signal at the carrier frequency $f_c$. The attenuation can be effected in the transmitter, in the mixer 52 or in the link between the two but is such as to enable the mixer to mix this attenuated signal with signals from the aerials 48 and 50 to separate the carrier component $f_c$ from the latter signals. The attenuated signal beats with the carrier component to produce a zero beat frequency signal.

When a tag 40 is present in the volume 34 and thus receiving signals at the frequencies $f_a$, $f_b$ and $f_c$ and provided the field strength of at least one frequency component is sufficient, inter modulation of the low and high frequency signals will occur in the non-linear device, i.e. the carrier frequency $f_c$ will be modulated by the two induction band frequencies $f_a$ and $f_b$. Generally, for external inter modulation to occur the field strength of at least one of the frequency components $f_a$, $f_b$ and $f_c$ must exceed 0.1 v per meter in the region of the non-linear device.

Once this threshold is exceeded the intensity of the inter modulation products varies in dependence on the field strengths of the incident frequency components. In the present example the inter modulation products are as follows:

$f_c \pm f_a$ (in the particular example 900.13 MHz and 899.87 MHz)
$f_c \pm f_b$ (899.92 MHz and 900.08 MHz)
$f_c \pm (f_a + f_b)$ (899.89 MHz and 900.21 MHz)
$f_c \pm (f_a - f_b)$ (899.95 MHz and 900.05 MHz)

The signals at frequencies $f_a$, $f_b$, $(f_a+f_b)$ and $(f_a-f_b)$ have thus become upper and lower sidebands on the carrier signal $f_c$. If the signal strengths of the components $f_a$, $f_b$ and $f_c$ greatly exceed the threshold value then additional inter modulation products are generated as follows:

$f_c \pm 2f_a$
$f_c \pm 2f_b$
$f_c \pm 2(f_a + f_b)$
$f_c \pm 2(f_a - f_b)$
$f_c \pm 2f_a + f_b$
$f_c \pm 2f_b + f_a$ etc.

In addition, the second harmonic $2f_c$ of the carrier frequency may be generated with the above sidebands.

Figure 4A:
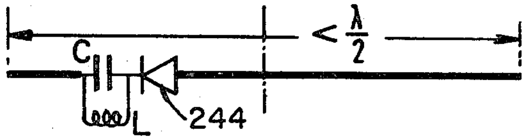

FIG. 4A shows a more sensitive form of marker tag to that shown in FIG. 4.

A coil of moderate 'Q' with an area of approximately 2 $cm^2$ and flat profile is inserted between the diode and, (preferably), the shorter of the two antenna arms. To increase the effective area of the coil without changing physical dimensions, a piece of ferrite or other suitable material may be employed as core material. Also to maintain the 900 MHz aerial at resonance, the tip to tip dimension should be reduced below half wavelength to compensate for the bulk of the coil and associated capacitor.

The coil is made to resonate at a frequency approximately mid-way between $f_a$ and $f_b$ by shunting it with capacitor C. The capacitor is preferably of the ceramic block type so that a low impedance may be presented to the 900 MHz current flowing simultaneously in the antenna system.

The low frequency voltages induced in the coil from the loop aerials are thus added in series with the 900 MHz compoent picked up by the antenna. The combination of these voltages impressed on a non-linear device causes inter modulation of the transmitter frequencies in the manner described earlier.

Apart from the signal voltage gain associated with the 'Q' of the coil, the voltages induced via magnetic coupling are less affected by the screening properties of certain types of merchandise.

The external inter modulation products generated in the tag 40 are reradiated and picked up by the receiver aerials 48, 50. The mixer 52 mixes these signals with the attenuated carrier signal from the transmitter 42, thus separating the carrier frequency from the inter modulation products. The output from the mixer 52 thus contains signals at frequencies $f_a$, $f_b$, $(f_a+f_b)$ and $(f_a-f_b)$, these being the most prominent.

The receiver 53 in the described embodiment selectively amplifies the first three of the above sidebands (the number of the sidebands chosen for selective amplification may of course be varied as may be the actual sidebands chosen) in three separate channels.

Each channel includes a respective filter 60, 62, 64 to which the output of the mixer 52 is connected.

The three filters are narrow pass band filters with centre frequencies respectively at the sideband frequencies, the filters serving to separate the three chosen sidebands and filter our any remaining and unwanted signals at the mixer output. Each filter 60, 62 64 is connected via a respective amplifier 66, 68, 70 to a level detector circuit 72, 74, 76 of a logic circuit 55, each level detector circuit being, for example, a Schmitt trigger designed to respond to a relatively low level input signal to switch its output from a logic 1 to a logic 0 signal. Input potentiometers 73, 75, 77 serve for adjusting the sensitivity of the trigger circuits.

The outputs of the two level detector circuits 74 and 76 are connected to respective inputs of a NAND gate 78 whose output is connected to one input of a further gate 80. The circuit 72 is connected to a second input of NAND gate 80 via an inverting amplifier 82.

Amplifiers 68 and 70 for sidebands $f_a$ and $f_b$ are also connected to respective level detector circuits 84 and 86 designed to respond to relatively high level input signals to switch their outputs from logic 1 to logic 0 signals. Potentiometers 85 and 87 also serve for adjusting the sensitivity of the level detector circuits 84 and 86. The outputs of the circuits 84, 86 are connected to respective inputs of a NAND gate 88 whose output is connected via an inverting amplifier 89 to one input of a NAND gate 90. The other input of NAND gate 90 is connected to the output of NAND gate 80 and its output is connected to warning device 92.

Assuming the marker tag 40 passes close to one of the induction band transmitter aerials, or example aerial 36, the field strength of signal $f_a$ at the tag 40 will be large thus producing a high depth of modulation of the carrier $f_c$ by $f_a$. The level of signal $f_a$ thus detected by the receiver and applied to the trigger circuits 74 and 84 would be high and exceed both the low and high level switching thresholds of the trigger circuits 74 and 84. The output of the latter would thus be at logic 0. The logic 0 output of the trigger circuit 84 would result in a logic 0 signal applied to one input of NAND gate 90 via NAND gate 88 and inverter 89. This would generate a logic 1 signal at the output of NAND gate 90 to activate the warning device 92. This result would not be affected by the state of the outputs of the trigger circuits for signals $f_b$ and $(f_a+f_b)$.

If the tag 40 passes close to aerial 38 the logic circuit would operate in a similar manner, the warning device 92 being activated via NAND gates 88, 90 and inverter 89 as a result of the intensity of the received $f_b$ signals.

However, if the tag 40 is introduced into the zone 34 the various sideband signals would be closer in amplitude and of lower intensity. The trigger circuits 84 and 86 would then of course remain unswitched, generating logic 1 outputs and a logic 1 signal at one input of the NAND gate 90. Therefore for the latter to activate the warning device, the low level trigger circuits 72, 74 and 76 must be switched in the combination or combinations to produce a logic 0 signal at the other input of NAND gate 90. In the illustrated circuit this requires a combination of low level signals $f_a$ or $f_b$ with $(f_a+f_b)$. A signal $f_a$ alone, $f_b$ alone or $(f_a+f_b)$ alone is insufficient to activate the warning device. The logic circuit may be expanded and modified to make use of further inter modulation products and further reduce the sensitivity of the system to false alarms.

A logic table for the logic circuit of FIG. 3 is given below:

| | Low | | High | | | | | | | |
|---|---|---|---|---|---|---|---|---|---|---|
| (fa + fb) | fa | fb | fa | fb | 78 | 82 | 80 | 88 | 89 | 90 |
| | 1 | 0 | 1 | 0 | 1 | | | 1 | 0 | 1 |
| | 0 | 1 | 0 | 1 | 1 | | | 1 | 0 | 1 |
| 0 | 1 | 0 | 0 | 0 | 1 | 0 | 1 | 0 | 1 | 0 |
| 1 | 1 | 0 | 0 | 0 | 1 | 1 | 0 | 0 | 1 | 1 |
| 0 | 0 | 1 | 0 | 0 | 1 | 0 | 1 | 0 | 1 | 0 |
| 1 | 0 | 1 | 0 | 0 | 1 | 1 | 0 | 0 | 1 | 1 |

The trigger stages 72, 74, 76, 84 and 86 may include detection and smoothing circuits to provide d.c. voltages proportional to the amplitude of the input signals.

In order to obtain an indication of the relative location of the tag 40 within the colume 34 the amplitudes of signals $f_a$ and $f_b$ are compared in a differential amplifier 100 and the resulting comparison signal utilised to energise visual indicators such as lamps 102 to 110 representing intervals of distance between the aerials 36 and 38. The output of the amplifier 100 may for example be in the form of a varying d.c. signal which is used to trigger various switching circuits 112 to 120 having progressively increasing switching thresholds. Although only five lamps are illustrated the positional indication can be made as coarse or as fine as desired by varying the number of lamps and switching circuits. The visual indicators may be replaced by an audible indicator, the different possible positions of the tag being represented by different audible frequencies, either discrete or continuously variable.

As an alternative to the use of a differential amplifier 100 or as an initial, coarse positional indicator the signals $f_a$ and $f_b$ could be utilised to activate respective visual or audible indicators whenever a certain signal threshold were exceeded. These indicators would be good for the fringe areas of zone 34 while the signal $(f_a+f_b)$ could be used to indicate a more central position where a strong composite signal $(f_a+f_b)$ would be expected.

Intermediate positions may be identified by combinations of the three signal strengths monitored by a suitable logic circuit which controls appropriate visual and/or audible indicators. The system of FIG. 3 could readily be adjusted for this purpose by connecting lamps to trigger circuits 84 and 86 and NAND gate 82, as indicated by arrows, the first two serving respectively to indicate extremes of the zone 34 and the third, the central region of zone 34.

One advantage of the present system when the latter is used to monitor a vertical area much as a doorway is described below. As a tag is brought towards the area, initially the difference in the distances of the tag from the two transmitter aerials is small compared to the actual distances and the difference in field strengths of the two signals $f_a$ and $f_b$ at the tag is negligible. The receiver thus indicates a central disposition of the tag. However, as the tag is brought closer, for example to pass close to aerial 36, the difference in field strengths of the two signals increases in significance to a maximum at the tag's shortest distance from the transmitters. As this difference in field strengths increases, and then decreases again once the tag has passed through the doorway, the receiver indicates a change in tag position from a central position to an extreme position and then back to a central position. It is therefore possible to determine, with accuracy not only the position of the tag in the doorway but the exact moment the tag is in the doorway.

The system of FIG. 3 may be further improved as shown in chain lines by amplitude modulating the transmitted frequencies $f_a$, $f_b$ with a tone frequency $f_m$ preferably in the range 10 $H_Z$ to 10 $KH_Z$, by means of a modulator 122. This tone $f_m$ can then be recovered from the signals $f_a$, $f_b$ and $(f_a+f_b)$ by suitable filters 124, 126, 128 in the logic circuit. This facilitates discrimination of weak signals from tags at considerable range from background noise. A number of different zones 34 may be controlled from the same three remote transmitters 30, 32 and 42 without interference proving a problem if a different modulation tone is used in each case.

Further improvement in the systems ability of distinguish genuine signals from noise may be obtained by comparing both phase and frequency of the transmitted signals $f_a$, $f_b$, $(f_a+f_b)$ with the received signals, or of the modulation tone filtered through filters 124 and 128 with the original modulating tone. A modification of FIG. 3 is shown in dotted lines where respective gating circuits 130, 132 and 134 are connected to the outputs of filters 124, 126 and 128, one input of each circuit 130, 132, 134 being connected to the modulator 122 such that signals from the filters 124 to 126 are only passed to the trigger circuits 72 to 76 when both phase and frequency coincide with the modulation signals from the modulator 122.

Figure 5:
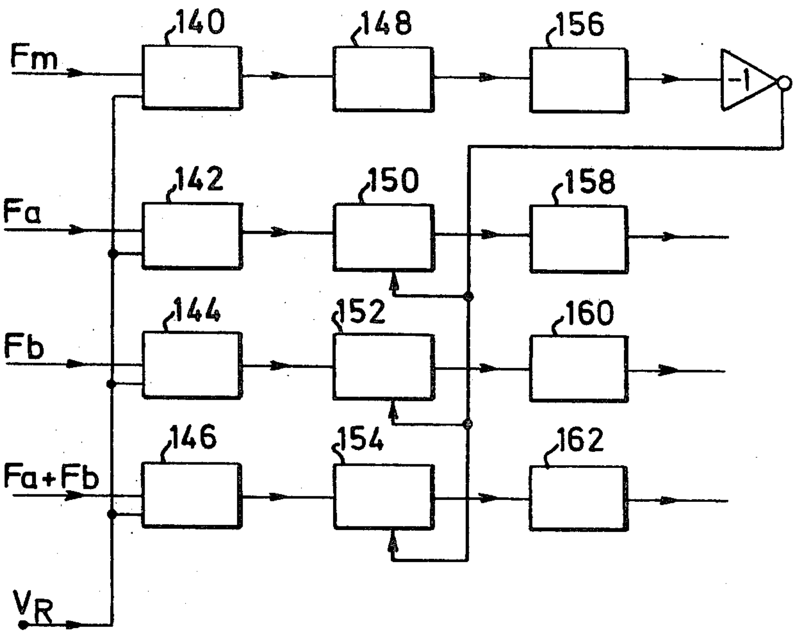
FIG. 5 is a circuit diagram of a modification for part of the system of FIG. 3.

A further modification of the system of FIG. 3 is shown in FIG. 5. This modification allows triggering of the warning device 92 only after a tag is present in the zone 34 for a preselected time. The outputs of the modulator 122 and the filters 124, 126 and 128 are each connected to a first input of a respective comparator 140, 142, 144, 146 a reference voltage source being connected to the second input thereof. Each comparator is connected by way of a respective divider circuit 148 to 154 for example a divide-by-ten circuit, to a BCD decoder 156 to 162. The output of decoder 156 is connected via a negating circuit shown connected to the output of decoder 156, to reset inputs of the divider circuits 150 to 54. The decoders 158 to 162 are set to provide an output signal at the eighth input pulse to the divider circuits 150 to 154 while decoder 156 is set to provide an output signal at the ninth input pulse to divider 148. (These counts may be varied as desired provided the count of decoder 156 is greater than those of decoders 158, 160 and 162.)

Each cycle of the modulating frequency $f_m$ generates a pulse at the output of comparator 140 which is applied to divider circuit 148. The decoder 156, at the ninth such successive pulse, resets the dividers 158 to 162. Where the input signals to comparators 142, 144 and 146 are random noise signals or weak intermittent modulation tone pulses the dividers 158 to 162 will be supplying an output pulse at the eighth input pulse to dividers 150 and 154. However, where the input signal to one or more of the comparators 142, to 146 is a continuous modulation tone (indicating the presence of a tag 40 in the volume 34) then the associated decoders 158, 160, 162 generates an output pulse before it can be reset by the decoder 156. The outputs of the decoders 158 to 162 are connected to the warning device 92 by way of a logic circuit such as that shown in FIG. 3 which activates the alarm for one or more desired combinations of output signals from counters 158, 160 and 162.

Finally, although the system described with reference to FIG. 3 uses the induction band frequencies, frequencies in the MegaHertz range, e.g. 13.5 $MH_Z$ may be used.

An automatic check for the system of the present invention may be provided by permanently locating in the zone a tag whose non-linear element is for example a diode which is inactive until stimulated by suitable means. A light responsive diode coupled via a fibre optic system to a light source which is periodically energised by the system for a short time, for example one second each ten minutes. At the same time the diode is activated the system can also activate a suitable indicator to show that the system is on test.

We claim:

1. A receptor reradiator for use in a system for detecting the position of said receptor reradiator in a surveillance zone, the system transmitting a first frequency signal $f_1$ and a second frequency signal $f_2$, so that said first and second signals define a center frequency $f_c=(f_1+f_2)/2$, comprising:

a dipole antenna having two metal conductive arms of a total length slightly less than half the wave length of the center frequency signal $f_c$, said two arms coming together at a point defining the electrical center of the dipole;

a non-linear semiconductor element disposed in one of said arms and offset from the electrical center of said dipole; and a parallel combination of a capacitance and inductance inserted in the arm containing the semiconductor element and tuned to receive said first and second frequency signals, so that said non-linear semiconductor element causes said dipole to reradiate an intermodulation signal generated by the first and second RF signals.

2. A receptor reradiator as claimed in claim 1 wherein said semiconductor element and dipole arms comprise a cuprous oxide semi-conductor connected between a pair of copper electrodes.

*

3. A receptor reradiator as claimed in claim 1 wherein said semiconductor element and dipole arms comprise a cuprous sulphide on cadmium sulphide semi-conductor connected between a pair of copper electrodes.

4. A receptor reradiator as claimed in claim 1 wherein said semiconductor element and dipole arms comprise a selenium semi-conductor connected between a pair of copper electrodes.

5. A receptor reradiator as claimed in claim 1 wherein said semiconductor element and dipole arms comprise a titanium dioxide semi-conductor between a titanium electrode and a silver electrode.

6. A receptor reradiator as claimed in claim 1 wherein said semiconductor element and dipole arms comprise a lead sulphide semi-conductor connected between a pair of copper or aluminium electrodes.

7. A receptor reradiator as claimed in claim 1 wherein said semiconductor element and dipole arms comprise a magnesium oxide semi-conductor connected between a magnesium electrode and an aluminium electrode.

8. A receptor reradiator as claimed in claim 1 wherein said semiconductor element and dipole arms comprise a aluminium ($AL_2O_3$) semi-conductor connected between a pair of aluminium electrodes.

9. A receptor reradiator as claimed in claim 1 wherein said semiconductor element and dipole arms comprise a zirconia ($ZrO_2$) on zirconium connected between aluminium electrodes.

10. A receptor reradiator as claimed in claim 1 wherein said semiconductor element and dipole arms comprise a gallium arsenide semi-conductor connected between a pair of gold or aluminium electrodes.

* * * * *